United States Patent [19]
Schmidt

[11] Patent Number: 5,810,127
[45] Date of Patent: Sep. 22, 1998

[54] PROPORTIONAL VALVE

[75] Inventor: Klaus Schmidt, Bergisch Gladbach, Germany

[73] Assignee: August Bilstein GmbH & Co. KG, Ennepetal, Germany

[21] Appl. No.: 749,099

[22] Filed: Nov. 14, 1996

Related U.S. Application Data

[63] Continuation-in-part of Ser. No. 502,395, Jul. 14, 1995, abandoned.

[30] Foreign Application Priority Data

Nov. 18, 1994 [DE] Germany .......................... 44 41 047.6

[51] Int. Cl.$^6$ ........................................................ F16F 9/46
[52] U.S. Cl. ...................................... 188/282; 188/322.15
[58] Field of Search ..................................... 188/299, 282, 188/289, 319, 322.15, 322.22, 279, 281, 283–85, 312–17; 251/38

[56] References Cited

U.S. PATENT DOCUMENTS

| | | | |
|---|---|---|---|
| 2,158,645 | 5/1939 | Willard | 188/322.16 X |
| 5,392,883 | 2/1995 | Huang et al. | 188/282 |

FOREIGN PATENT DOCUMENTS

| | | | |
|---|---|---|---|
| 4022098 | 7/1991 | Germany | 188/282 |
| 69132 | 4/1982 | Japan | 188/282 |
| 1444400 | 7/1986 | Japan | 188/322.17 |

*Primary Examiner*—Josie Ballato
*Attorney, Agent, or Firm*—Max Fogiel

[57] ABSTRACT

A proportional valve for a hydraulic dashpot with a piston and cylinder. The piston travels back and forth in the cylinder on the end of a rod, accommodates pressure-dependent valves for hydraulic fluid to travel back and forth through during both the compression and decompression phases, separates the interior of the cylinder into two dynamics chambers, accommodates channels that provide a route for the fluid that actuates the valves to flow through directly, and accommodates a series of bypass channels. The bypass channels accommodate an electromagnetically actuated bolt. The bolt slides back and forth in the bypass channels, regulating how much fluid can flow through them. The end of each valve facing away from the direct-route channels accommodates a compartment for generating pressure in. Each pressure-generation compartment communicates through the bypass channels with the dynamics chamber on the other side of the piston. The pressure-generation compartment is resiliently sealed off from its associated dynamics chamber. The pressure-generation compartment is demarcated by the valve's disk, by a component that resiliently seals it off from its associated dynamics chamber, by the areas of the piston wall that accommodate the entrances to the bypass channels, and/or by rings inserted into the piston. The resiliently sealing component in the pressure-generation compartment associated with the dynamics chamber at the other end is forced out of the way by the fluid in that dynamics chamber.

11 Claims, 5 Drawing Sheets

PROPORTIONAL VALVE

BACKGROUND OF THE INVENTION

The present application is a continuation-in-part of the parent application Ser. No. 08/502,395 filed Jul. 14, 1995, now abandoned.

The present invention concerns a proportional valve for a hydraulic dashpot. The dashpot essentially comprises a piston and cylinder. The piston travels back and forth in the cylinder on the end of a rod, accommodates pressure-dependent valves for hydraulic fluid to travel back and forth through during both the compression and decompression phases, separates the interior of the cylinder into two dynamics chambers, accommodates channels that provide a route for the fluid that actuates the valves to flow through directly, and accommodates a series of bypass channels. The bypass channels accommodate an electromagnetically actuated bolt. The bolt slides back and forth in the bypass channels, regulating how much fluid can flow through them. The end of the valve facing away from the direct-route channels accommodates a compartment for generating pressure. Each pressure-generation compartment communicates through the bypass channels with the dynamics chamber on the other side of the piston. The pressure-generation compartment is resiliently sealed off from its associated dynamics chamber.

Such proportional valves have upstream controls to ensure that the lifting of the valve disks can be controlled by the pressure generated in the pressure-generation compartment against the end of the valve facing away from the direct-route channels. An impedance is accordingly generated in the pressure-generation compartment through a series of bypass channels. It is only this impedance, apart from any constant flow through the valve disk or the associated supporting edge, that releases the main flow at a prescribed operating state.

A proportional valve of this genus is described in German 3 348 176 C2. Operating pressure from a pressure-application chamber 40 can be applied to the valve disks by way of a support 38. The operating pressure is applied through a series of bypass channels. The bypass channels can be opened and closed and the flow of fluid through them constricted by an additional disk valve 45.

One drawback of such a design is that the upstream controls can be established at only one end by way of an electromagnetically controlled valve that is effective only at that end. Another drawback is that the pressure-application chamber is entirely inside the piston, whereby it is possible to close only one end by means of another support.

This design is complicated, even with its strictly unilateral structure, and is difficult to handle from the manufacturing aspect, making the concept of a possibly bilateral structure with pressure-application chambers that act opposite each other seem unreasonable.

A number of additional bypass bores extending inside the piston are also necessary, along with a cutout or bore inside the valve disk, required for unimpeded passage of enough fluid to control the system.

Another drawback is that the functions of the blocking valve and control valve are both combined in the aforesaid valve disk 45. The result is a lack of constancy in the volumetric flow, due to fluttering on the part of the valve for example, especially in the event of high-frequency and low-amplitude oscillations.

SUMMARY OF THE INVENTION

The object of the present invention is accordingly a proportional valve with upstream controls that cannot only be operated and controlled from each end but is also in particular easy to handle from the manufacturing and production aspects due to the simplest possible design. All inconstancy in the bypass flow will also be avoided due to precise definition of the flow cross-section.

The pressure-generation compartment is accordingly demarcated by the valve's disk, by the component that resiliently seals it off from its associated dynamics chamber, by the areas of the piston wall that accommodate the entrances to the bypass channels, and/or by rings inserted into the piston. The resiliently sealing component in the pressure-generation compartment associated with the dynamics chamber at the other end is forced out of the way by the fluid in that dynamics chamber.

A pressure-generation compartment and valve disks of this type combined with resiliently sealing components result in a very simple design, essentially comprising annular components that are easy to attach together. There will also be fewer channels in the bypass series because the resilient seal against the dynamics chamber associated with whatever disk is at the other end will be exploited instead of a particular channel for example to provide entry for enough fluid to control the system.

The components that resiliently seal the pressure-generation compartment off from its associated dynamics chamber in one particularly practical embodiment of the present invention release fluid for this purpose into the opposing pressure-generation compartment when the pressure of the fluid is not powerful enough to force out of the way the opposing disks that are keeping whichever dynamics chamber is the other dynamics chamber closed. The flow acts against one side of the disks that are keeping whichever dynamics chamber is at the other end closed. That side is the side of the disks that faces away from the channels.

This approach is a simple way of actuating whichever valve disk is at the other end, depending on the level of constriction established in the bypass channels. There will be enough operating pressure available even at the very beginning of each piston stroke, and the pressure will be maintained even if the direction is reversed and the disk closed.

It is of advantage in this event for the resiliently sealing components to be cup-shaped lock washers accommodated in the piston and applying force to the disk, generally at the outer edge.

Cup-shaped lock washers are very easy to produce, and their resilience properties can be established as desired.

Just as easy to manufacture and adjust are resiliently sealing components in the form of lock washers with a bent-in wall accommodated in the piston and applying force to the disk.

Particularly appropriate for proportional valves that must occupy as little space axially as possible are resiliently sealing components in the form O rings accommodated in the piston and applying force to the disk.

Resiliently sealing components in the form of O rings can be employed in conjunction with prefabricated annular accommodations to further facilitate assembly.

The resiliently sealing components in another advantageous embodiment are composite metal and non-metal components accommodated in the piston and applying force to the disk. Such composites are essential elastomer or rubber and metal.

The exits into the particular dynamics chambers from the bypass channels in another advantageous embodiment of the present invention accommodate forward-only valves that prevent the fluid from the particular dynamics chamber from entering the bypass.

Separate forward-only valves of this type are very easy to accommodate and operate and represent mechanically reliable seals that tolerate high-frequency oscillations.

The electromagnetically actuated bolt that regulates how much fluid can flow through the bypass channels in another advantageous embodiment is a separate control component upstream of the forward-only valves and acts in both the compression and decompression phases.

The constricting function is accordingly completely separate from the forward-only valves' sealing function. The constricted fluid will flow completely smoothly through a channel of precisely defined cross-section. The flow in both directions, during both the compression and the decompression phase, that is, can be controlled with only one electromagnetically actuated bolt. The piston can accordingly be smaller and simpler.

BRIEF DESCRIPTION OF THE DRAWINGS

Embodiments of the present invention will now be specified with reference to the accompanying drawing, wherein.

DESCRIPTION OF THE PREFERRED EMBODIMENTS

Figure 1:
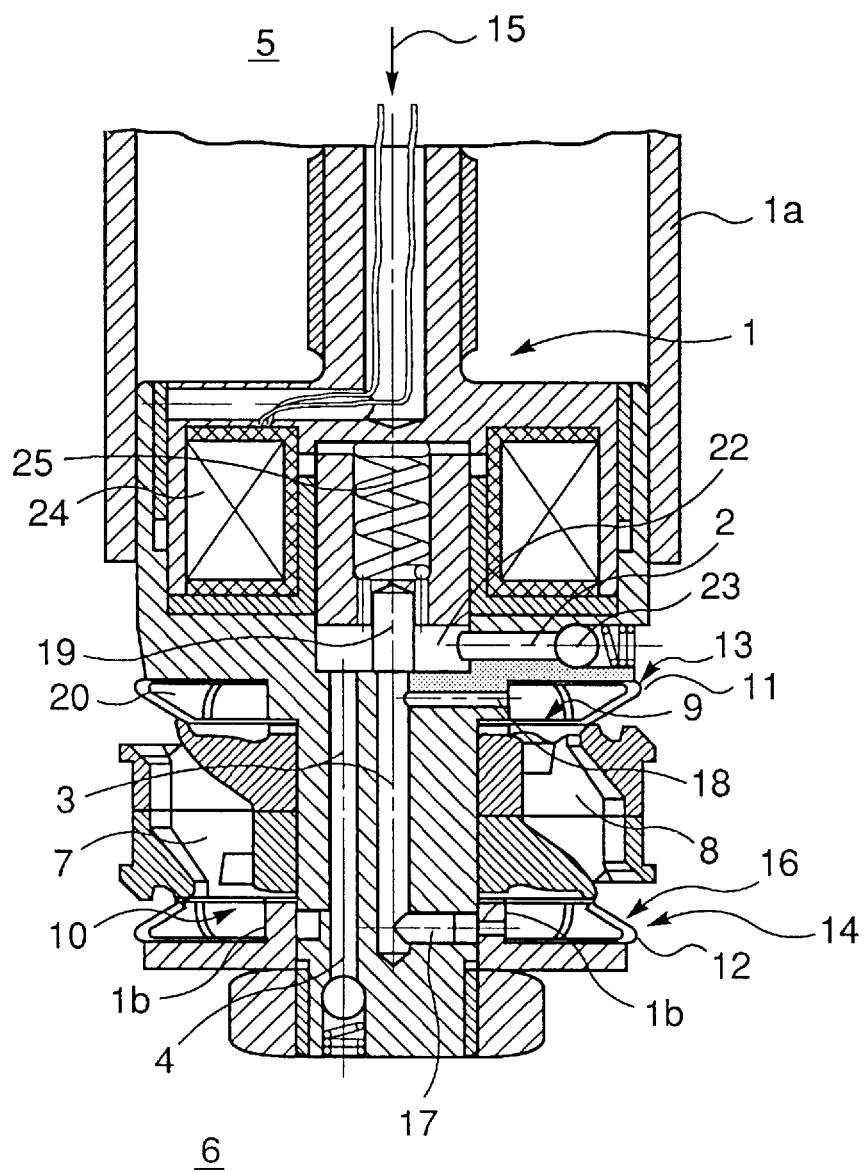
FIG. 1 illustrates a proportional valve with resilient components are the form of cup-shaped lock washers.

The piston 1 illustrated in FIG. 1 accommodates a series of bypass channels 2, 3, and 4.

The piston travels back and forth in a cylinder 1a and separates it into two dynamics chambers 5 and 6.

Piston 1 also accommodates pressure-sensitive valves 13 and 14. Valve 13 comprises a disk 9 and a resilient cup-shaped component 11 and valve 14 a disk 10 and a resilient cup-shaped component 12. Piston 1, finally, accommodates channels 7 and 8. Channels 7 and 8 provide a route for the fluid that acts on valve disks 9 and 10 to flow directly through.

A bolt 19 slides back and forth in bypass channels 2, 3, and 4 regulating how much fluid can flow through them.

When piston 1 is in the compression phase, moving in the direction indicated by arrow 15, the pressure of the fluid in chamber 6 will initially lift the inward tapering collar 16 of resilient component 12. The fluid will flow through a bore 17, through bypass channel 3, and through another bore 18 in the vicinity of bolt 19 into a compartment 20. In compartment 20, the fluid will create an impedance to the main flow of fluid against the disk 9 in valve 13 through direct-route channel 8. The pressure-generation compartment 20, furthermore, is demarcated, bordered or defined by the valves disk 9 through a component 12 that resiliently seals it off from its associated dynamics chamber by the areas 1b of a piston wall that accommodate the entrances to the bypass channels.

As bolt 19 continues to open the passage, the pressure in pressure-generation compartment 20 will decrease as the fluid flows out through bypass channel 3 by way of a hydraulics compartment 22, through bypass channel 2 by way of a forward-only valve 23, and into the opposite dynamics chamber 5.

Bolt 19 is actuated by an electromagnet 24. A spring 25 maintains bolt 19 in its disengaged or non-actuated position, blocking the passage.

Figure 2:
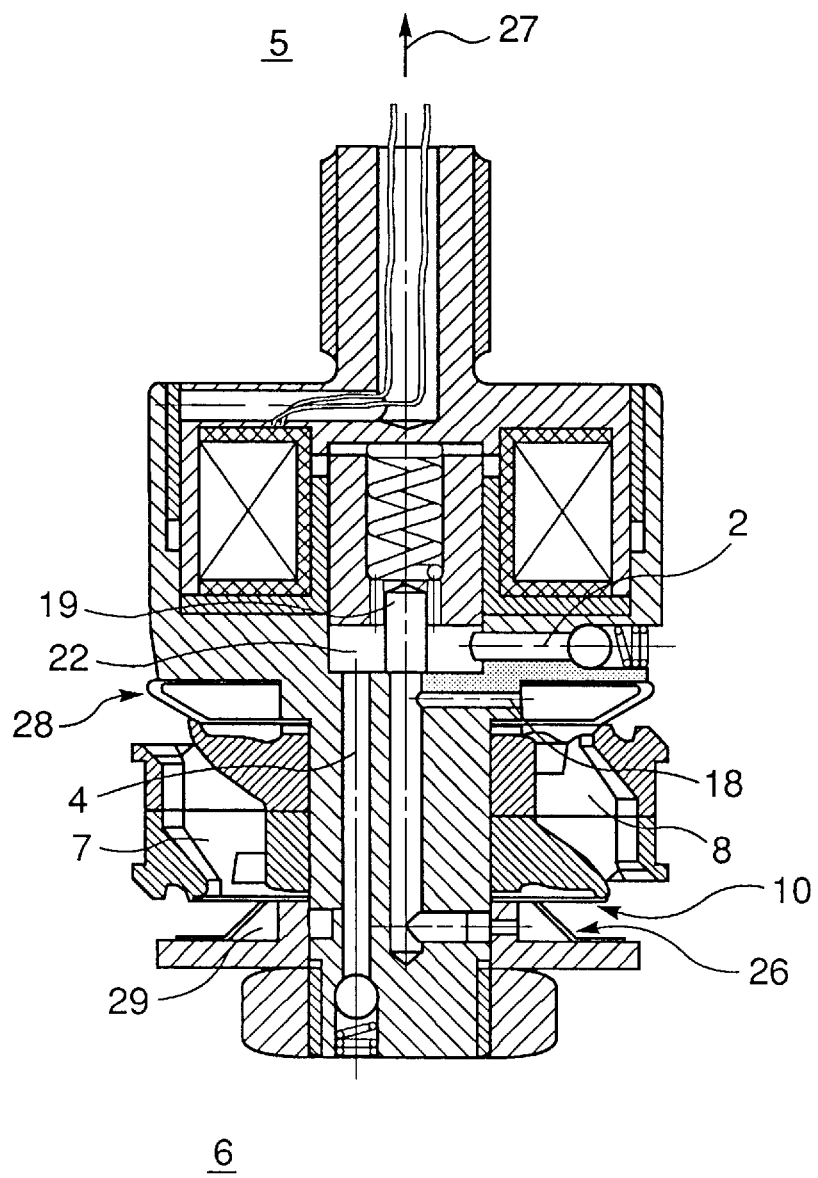
FIG. 2 a proportional valve in which a resilient component in the form of a lock washer with a bent-in side.

The bottom resilient component in another embodiment illustrated in FIG. 2 is a lock washer 26 with a bent-in wall.

When the piston is in the decompression phase as illustrated in the figure and is moving in the direction indicated by arrow 27, the hydraulics portion will initially flow as the inward-tapering collar of the cup-shaped upper resilient component 28 moves out of the way and, constricted by bolt 19, through bore 18 and bypass channel 3 and through hydraulics compartment 22 and bypass channel 4 before arriving in a pressure-generation compartment 29. In pressure-generation compartment 29 the fluid will, due to the bent side of lock washer 26, create an impedance to the main flow of fluid against the disk 10 in valve 14 through direct-route channel 7. In a further embodiment, the proportional valve may be constructed with the resiliently sealing components in the form of O rings 1c accommodated in the piston and applying force to the disk.

Figure 3:
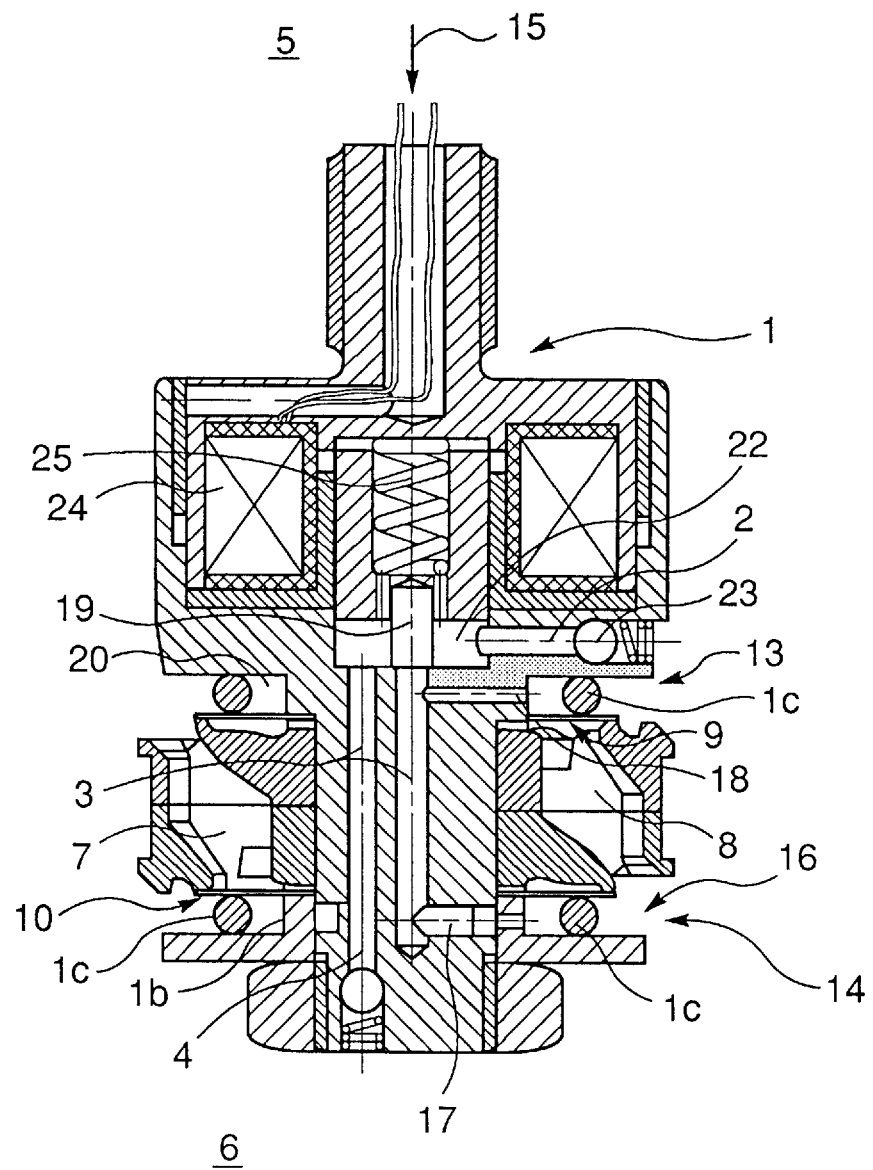
FIG. 3 is another embodiment of FIG. 1 in which the resilient cup-shaped components are replaced by O-rings.
Figure 4:
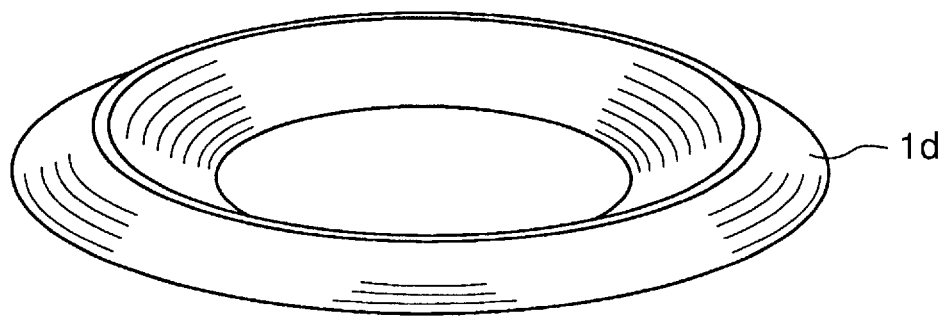
FIG. 4 is a perspective view of a cup-shaped embodiment of a resilient component.
Figure 5:
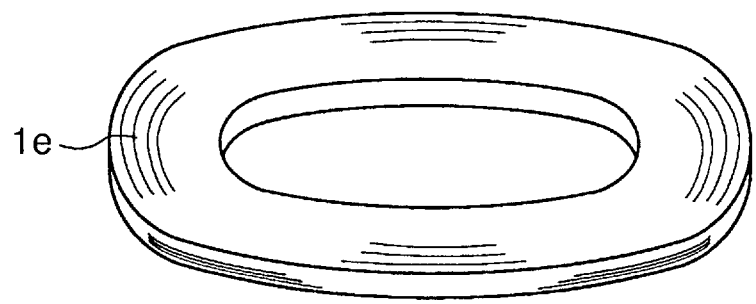
FIG. 5 is a perspective view of a ring which is held in a piston, in another embodiment of the present invention.
Figure 6:
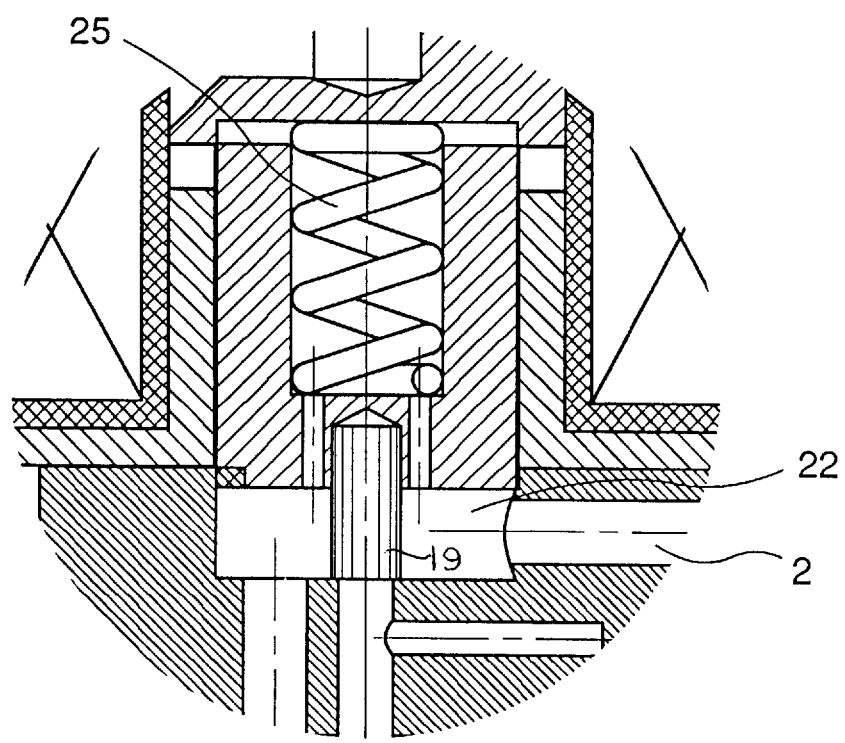
FIG. 6 is a partial sectional view and shows the structure of the bolt member in FIG. 1.

In the embodiment of FIG. 3, the O-ring 1c is shown as not being a part of the component 11, 12.

In this Figure, the O-ring replaces the cup-shaped lock washer 12.

The resiliently sealing components, moreover, may be cup-shaped lock washers 1d accommodated in the piston and applying force to the disk.

The resiliently sealing components may also be made of composite metal and non-metal components accommodated in the piston and applying force to the disk.

The resiliently sealing components, furthermore, can be in the form of rings 1e inserted into the piston.

The present invention provides a novel solution in the construction of a valve in which the damping valve disks produce proportionately the pressure in the opposite operating chamber with more or less intensity. This results through a pressure chamber which is formed together with further parts, of the damping valve disks.

The function of the cup-shaped elements is to operate exclusively on a damping valve disk, and they are mentioned in plural form. This arises on the basis that in actuality, it applies to the compression as well as the suction stages in which the same elements may be used, so that an elastic element acts always on the damping valve disk.

I claim:

1. A proportional valve for a hydraulic dashpot, said valve comprising: a piston and cylinder, said piston traveling back and forth in said cylinder on an end of a rod and accommodating pressure-dependent valves for hydrauli fluid to travel back and forth during compression and decompression phases, said cylinder having an interior separated into two dynamics chambers, said piston and cylinder accommodating channels providing a route for fluid actuating said pressure-dependent valves to flow through directly and accommodating a dating channels providing a route for fluid actuating said pressure-dependent valves to flow through directly and accommodating a series of bypass channels with an electromagnetically-actuated bolt sliding back and forth in said bypass channels for regulating how much fluid can flow through said bypass channels, each of said pressure-dependent valves having an end facing away from direct-route channels and accommodating a compartment for generating pressure therein, each said pressure-generation compartment communicating through said bypass channels, said pressure-generation compartment being resiliently sealed off from its associated dynamics chamber; said pressure-dependent valves having disks demarcating said pressure-generation compartment; means for resiliently sealing off said disks from one dynamics chamber associated with said disks at areas of a piston wall accommodating entrances to said bypass channels; said resiliently sealing means in the pressure-generation compartment associated with the other dynamics chamber being forced out of the way by fluid in said other dynamics chamber, said pressure-dependent valves being actuated by said pressure-generation compartment proportionately to pressure with variable intensity in an associated dynamics chamber, and having a characteristic influenced by said pressure, said pressure-generation compartment being formed substantially by said pressure-dependent valves, pressure in said pressure-generation compartment being substantially variable.

2. A proportional valve for a hydraulic dashpot as defined in claim 1, wherein said means resiliently sealing the pressure-generation compartment off from its associated dynamics chamber release fluid into an opposite pressure-generation compartment when pressure of the fluid is insufficiently powerful to force out of the way the opposite disks keeping whichever dynamics chamber is the other dynamics chamber closed, flow acting against one side of the disks keeping whichever dynamics chamber is at the other end closed, said one side being the side of the disks facing away from said channels.

3. A proportional valve for a hydraulic dashpot as defined in claim 1, wherein said resiliently sealing means are cup-shaped lock washers accommodated in said piston and applying force to the disks.

4. A proportional valve for a hydraulic dashpot as defined in claim 1, wherein said resiliently sealing means are lock washers with a bent-in wall accommodated in said piston and applying forces to the disks.

5. A proportional valve for a hydraulic dashpot as defined in claim 1, wherein said resiliently sealing means are O rings accommodated in said piston and applying forces to the disks.

6. A proportional valve for a hydraulic dashpot as defined in claim 1, wherein said resiliently sealing means are comprised of composite metal and non-metal components accommodated in said piston and applying forces to the disks.

7. A proportional valve for a hydraulic dashpot as defined in claim 1, including exits into specific dynamics chambers from said bypass channels accommodating forward-only valves preventing fluid from the specific dynamics chamber from entering said bypass channels.

8. A proportional valve for a hydraulic dashpot as defined in claim 7, wherein said electromagnetically-actuated bolt regulating fluid flow quantity through said bypass channels comprises separate control means upstream of said forward-only valves and acting in compression and decompression phases.

9. A proportional valve as defined in claim 8, wherein said resiliently sealing means comprises rings inserted into said piston.

10. A proportional valve for a hydraulic dashpot, said valve comprising: a piston and cylinder, said piston traveling back and forth in said cylinder on an end of a rod and accommodating pressure-dependent valves for hydraulic fluid to travel back and forth during compression and decompression phases, said cylinder having an interior separated into two dynamics chambers, said piston and cylinder accommodating direct-route channels providing a route for fluid actuating said pressure-dependent valves to flow through directly and accommodating a series of bypass channels with an electromagnetically-actuated bolt sliding back and forth in said bypass channels for regulating how much fluid can flow through said bypass channels, each of said pressure-dependent valves having an end facing away from said direct-route channels and accommodating a compartment for generating pressure therein, each said pressure-generation compartment communicating through said bypass channels, said pressure-generation compartment being resiliently sealed off from its associated dynamics chamber; said pressure-dependent valves having disks demarcating said pressure-generation compartment; means for resiliently sealing off said disks from one dynamics chamber associated with said disks by rings inserted into said piston, said resiliently sealing means in the pressure-generation compartment associated with the other dynamics chamber being forced out of the way by fluid in said other dynamics chamber, said pressure-dependent valves being actuated by said pressure-generation compartment proportionately to pressure with variable intensity in an associated dynamics chamber and having a characteristic influenced by said pressure, said pressure-generation compartment being formed substantially by said pressure-dependent valves, pressure in said pressure-generation compartment being substantially variable.

11. A proportional valve for a hydraulic dashpot, said valve comprising: a piston and cylinder, said piston traveling back and forth in said cylinder on an end of a rod and accommodating pressure-dependent valves for hydraulic fluid to travel back and forth during compression and decompression phases, said cylinder having an interior separated into two dynamics chambers, said piston and cylinder accommodating channels providing a route for fluid actuating said pressure-dependent valves to flow through directly and accommodating a series of bypass channels with an electromagnetically-actuated bolt sliding back and forth in said bypass channels for regulating how much fluid can flow through said bypass channels each of said pressure-dependent valves having an end facing away from direct-route channels and accommodating a compartment for generating pressure therein, each said pressure-generation compartment communicating through said bypass channels, said pressure-generation compartment being resiliently sealed off from its associated dynamics chamber; said pressure-dependent valves having disks demarcating said pressure-generation compartment; means for resiliently sealing off said disks from one dynamics chamber associated with said disks at areas of a piston wall accommodating entrances to said bypass channels; said resiliently sealing means in the pressure-generation compartment associated with the other dynamics chamber being forced out of the way by fluid in said other dynamics chamber, said pressure-dependent valves being actuated by said pressure-generation compartment proportionately to pressure with variable intensity in an associated dynamics chamber and having a characteristic influenced by said pressure, said pressure-generation compartment being formed substantially by said pressure-dependent valves; said means resiliently sealing the pressure-generation compartment off from its associated dynamics chamber release fluid into an opposite pressure-generation compartment when pressure of the fluid is insufficiently powerful to force out of the way the opposite disks keeping whichever dynamics chamber is the other dynamics chamber closed, flow acting against one side of the disks keeping whichever dynamics chamber is at the other end closed, said one side being the side of the disks facing away from said channels; exits into specific dynamics chambers from said bypass channels accommodating forward-only valves preventing fluid from the specific dynamics chamber from entering said bypass channels; said electromagnetically-actuated bolt regulating fluid flow quantity through said bypass channels comprising separate control means upstream of said forward-only valves and acting in compression and decompression phases, pressure in said pressure-generation compartment being substantially variable.

* * * * *